April 16, 1968     L. ROMANZI, JR., ETAL     3,378,301
SHOULDER STRAP-LAP BELT BUCKLE CONNECTOR
Filed March 6, 1967     2 Sheets-Sheet 1
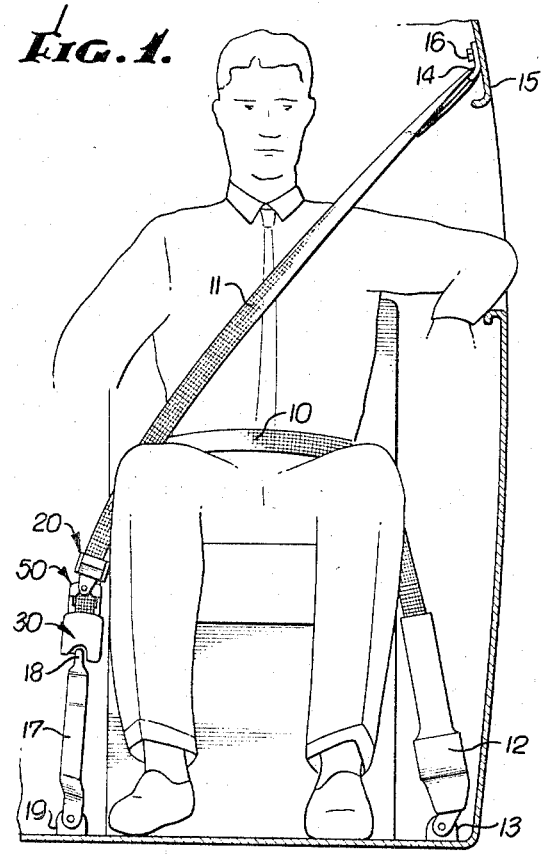
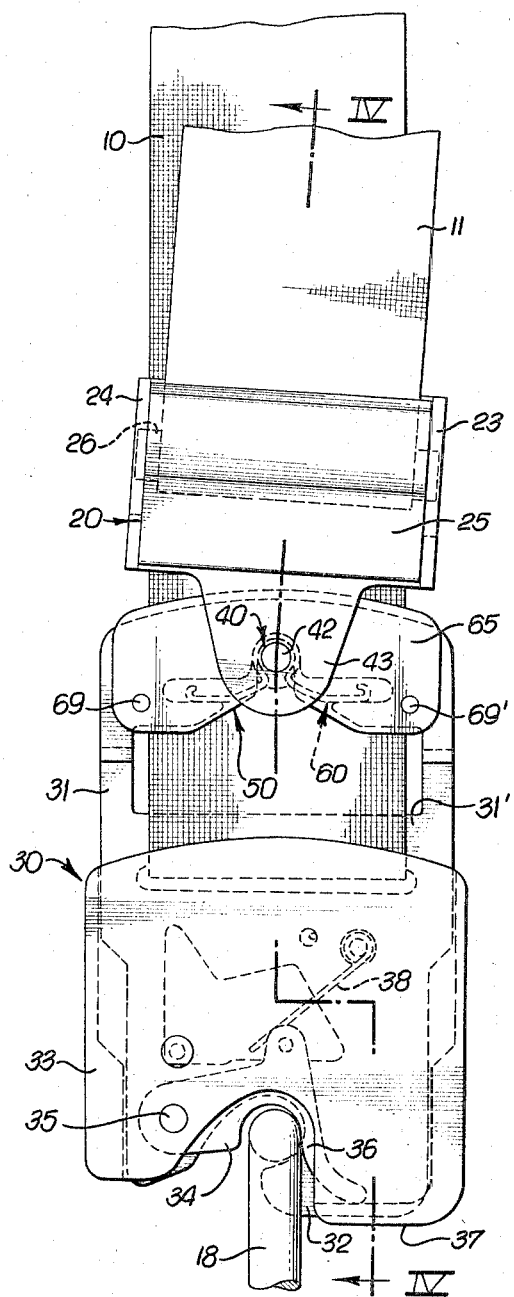
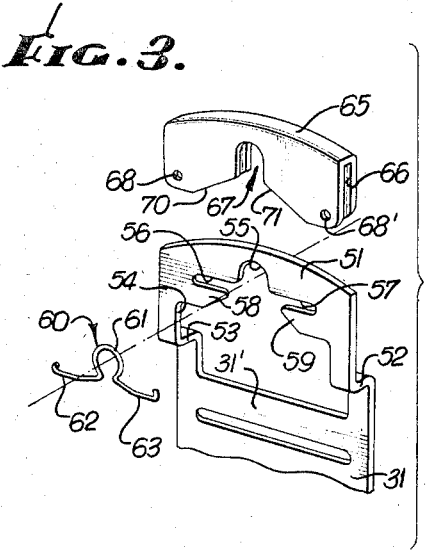
INVENTORS.
LOUIS ROMANZI, JR.
JEFFREY VAN DORN
By Miketta, Jenny, Pons & Smith
ATTORNEYS.

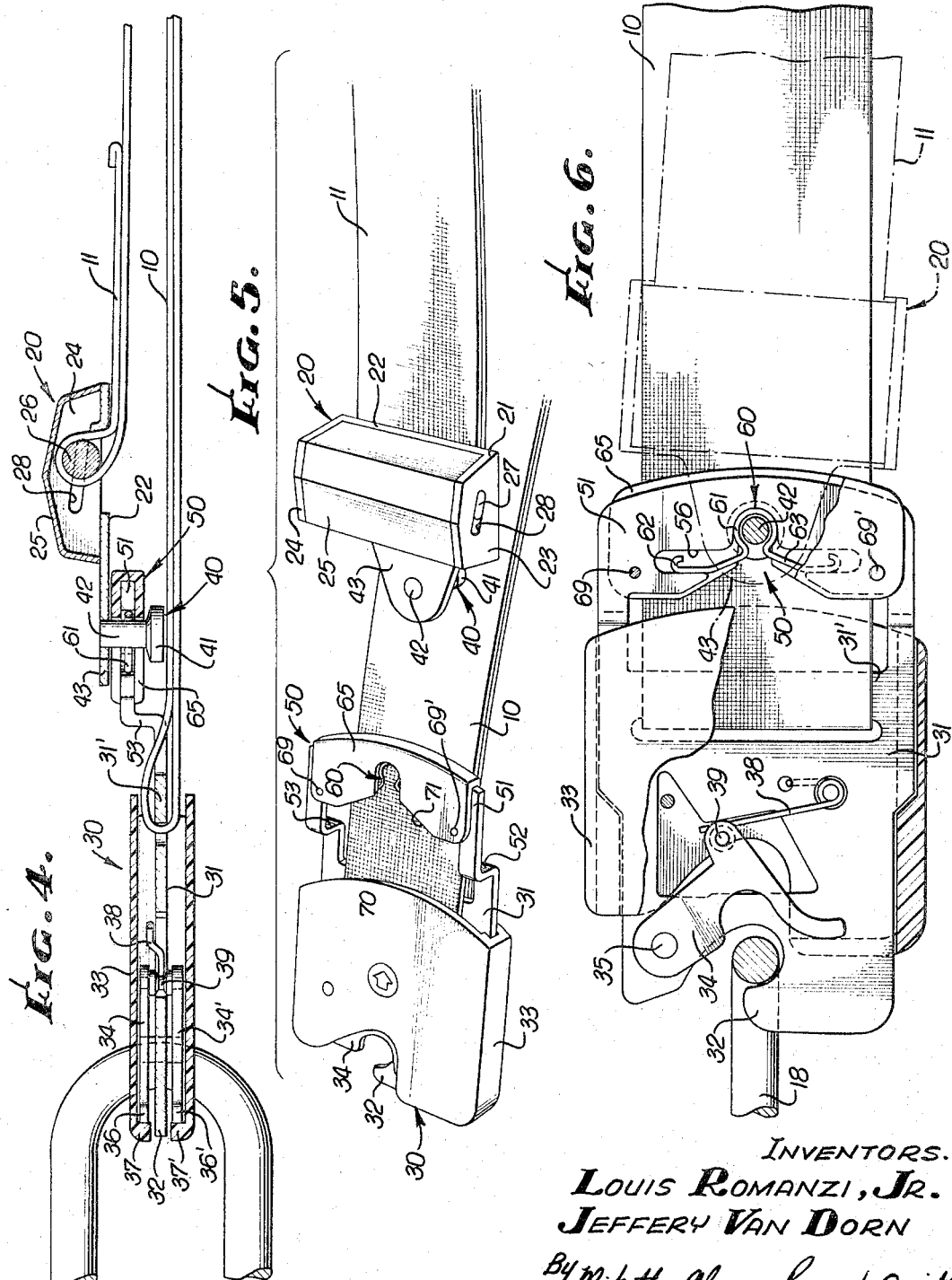

United States Patent Office 3,378,301
Patented Apr. 16, 1968

3,378,301
SHOULDER STRAP-LAP BELT BUCKLE
CONNECTOR
Louis Romanzi, Jr., Detroit, and Jeffery Van Dorn, Southfield, Mich., assignors to American Safety Equipment Corporation, New York, N.Y., a corporation of New York
Filed Mar. 6, 1967, Ser. No. 620,721
9 Claims. (Cl. 297—389)

ABSTRACT OF THE DISCLOSURE

A connector device for releasably connecting an end of a shoulder harness strap directly to a buckling means provided in a lap-type safety belt employed in moving vehicles to transmit loading on the shoulder strap directly to the buckling means and its associated floor anchorage. A connector pin mounted on and extending laterally of a plate-like extension on a shoulder strap end fitting is releasably pivoted or journaled over an approximately 180 degree abutment surface formed integrally in an extension of the associated buckling means main frame member when assembled thereto and a spring means with an associated cover is positioned at the abutment surface with a split-ring spring body into which the pin is assembled and by which the pin is biased against removal from the buckling means main frame.

Background of the invention

Combination shoulder harness and lap belt safety restraint devices have become more widely used in recent years, not only because of their recognized improved safety characteristics when in use in moving vehicles, but because of Federal legislation demanding their use in new automobiles. Prior seat belt-shoulder harness combinations have been generally a type employed in aircraft by aviators and have not been designed specifically for automotive use. In such aircraft harness combinations, the buckling and shoulder strap connector means are quite involved with parachute harness straps and other equipment not found in automotive uses.

Prior shoulder harness and seat or lap belt combination employed in automobiles have either been of a type which may not be released from associated buckling means or have been fixedly or releasably attached to a lap belt strap rather than the belt buckle. It is the principal object of the present invention to disclose and provide an improved connector for releasably connecting a shoulder strap directly to a main frame or structurally strong portion of the lap belt buckling means so that loading on the shoulder strap is transmitted directly through the strong structural portion of the usual metal buckle to the associated floor anchorage of the vehicle.

It is another object of the present invention to disclose and provide an improved connector as in the foregoing object wherein a novel arrangement of an abutment surface of approximately 180 degrees is formed integrally of the buckling means main frame member at an aperture therethrough and a circular, split-ring spring body is associated therewith to provide a connector pin receiving and releasably retaining means which allows assembly or disassembly of the connector pin and associated end fitting to the buckling means without need for operating buckling means and so that shoulder strap pull under load condition is transmitted through said spring body directly to the buckling means main frame member abutment surface.

Summary of the invention

Generally stated, the present invention includes the provision of a connector pin means on an otherwise conventional shoulder strap end fitting by means of an additional plate-like extension of the fitting. Pin receiving and journaling or abutment means are provided as part of the otherwise conventional belt buckling means by extending a main frame or other structurally strong portion of the belt buckle rearwardly over and off-set above the lap belt strap attachment means. The pin receiving and abutment means for pivoting or journaling the shoulder strap end fitting to the buckle, are provided by an approximately 180 degree semi-circular abutment surface formed in a ported or apertured portion of the extension of the buckle main frame member and a circular body, split ring, spring means positioned at said abutment surface by leg portions extending into opposed slots in the buckle extension portion. A cover for the spring and buckle extension holds the spring against lateral removal from the extension.

The shoulder strap end fitting is thereby very easily assembled or disassembled directly to or from the main frame member of the lap belt buckling means without need for operation of the lap belt buckle. Shoulder strap loading and the pull applied thereby to the lap belt buckling means is received by the buckle extension abutment surface in such a way that the shoulder strap cannot be pulled loose of the buckling means under load but is easily released against the associated spring means bias when not under load.

These and various other advantages and objects of the present invention will become apparent to those skilled in the art from a consideration of the following detailed description of the preferred exemplary embodiment of a shoulder strap-lap belt buckle connector according to the invention. Reference will be made to the appended sheets of drawings in which:

FIG. 1 is an elevational view of an exemplary conventional installation of a combination shoulder harness and lap belt restraint device employing an exemplary embodiment of the shoulder strap-lap belt buckle connector device according to the present invention;

FIG. 2 is an enlarged detail plan view of the exemplary embodiment of improvement in shoulder strap-lap belt buckle connector device of FIG. 1;

FIG. 3 is an exploded perspective view of a portion of the device of FIG. 2;

FIG. 4 is a transverse sectional view of the device of FIG. 3 taken therein along the plane IV—IV;

FIG. 5 is a perspective view of the shoulder strap-lap belt buckle connector device of FIGS. 1 through 4 in disassembled relations; and FIG. 6 is a plan view of the device of FIG. 2 showing the associated buckling means moved from the locking position of FIG. 2 into a release position.

Referring first to FIG. 1, the preferred exemplary embodiment of the improvement in shoulder strap-lap belt buckle connector device, according to the present invention, is shown in use in a conventional shoulder harness and lap belt restraint device installation, including a lap belt 10 and a shoulder strap 11. The lap belt 10 includes a single strap wound upon a spring wound drum within a retraction mechanism 12. Mechanism 12 may be constructed in any manner presently known to those skilled in the art such as in the Replogle, United States Letters Patent No. 3,174,704 and is pivotally mounted to a floor fitting or anchorage 13. The opposite end of the lap belt strap 10 is secured to the main frame member of a buckle, indicated generally at 30, as hereinafter explained.

Shoulder strap 11 is connected by a conventional shoulder strap mounting or fitting 14 to the vehicle body or frame 15 at a location above and behind the passengers shoulder by the bolt 16. Strap 11 is mounted to be positioned diagonally across the passenger's chest when in use. According to the present invention, shoulder strap 11 is connected by the improvement in shoulder strap-lap belt buckle connector device, indicated generally at 50, directly to the lap belt buckle, indicated generally at 30.

The lap belt buckle, indicated generally at 30, may be connected to a cooperating connecting fitting mounted by a second lap belt strap to a floor anchorage or, as in the exemplary embodiment, to a metal harp of floor anchorage 17 having the eye or hook portion 18. Harp of floor anchorage 17 includes a pair of spaced legs mounted to a pair of floor fittings, as fitting 19, to form a generally U-shaped anchorage having the upper eye of hook end 18 to receive the buckle locking means, as hereinafter explained. The particular means for locking the buckle to the eye or hook 18, in the exemplary embodiment, is not considered a part of the present invention, but is included and will be described herein to disclose an exemplary form of buckle means in which the improved shoulder strap-lap belt buckle connector device may be employed.

Referring now to FIGS. 2, 4 and 6, the exemplary buckle or buckling means indicated generally at 30, includes a main frame member or base plate 31 through which the lap belt loading is transmitted. Base plate or main frame member 31 includes a hook portion 32, to fit about the eye 18 of harp or anchorage 17, and a transverse bar portion 31' about which the associated lap belt strap 10 is secured. A cover 33, generally made of a light weight plastic material, such as that sold under the trade name Zytel 101 Nylon, is mounted upon the base plate or main frame member 31 for a limited axial movement relative thereto for operation of a latch means 34.

In the buckle position shown in FIG. 2, latch means 34 prevent the withdrawal of the anchorage eye 18 from within the hook portion 32 of the buckle. However, latch member 34 is pivoted, on its pivot pin 35, into the release position of FIG. 6 when the cover 33 is moved rearwardly on base plate 31. A latch arm 36 or latch means 34 is abutted by the forward wall 37 of the cover plate on rearward or releasing movement of the cover 33 to release the hook 18. Latch means 34 is biased into the locked position of FIG. 2 by the spring 38 which is mounted to the buckle base plate 31 as best seen in FIG. 6. Spring 38 has an arm which bears against a cross bar 39 of the latch means, as best seen in FIG. 4.

From the foregoing, it may be seen that the buckle means, indicated generally at 30, is readily released from its associated floor anchorage by merely moving the cover 33 in a direction away from the anchorage 17.

As particularly contemplated within the present invention, the shoulder strap 11 is adapted to be connected directly into the buckle base plate or main frame member 31 by the improved shoulder strap-lap belt buckle connector device disclosed herein. In general, and as best seen in FIG. 5, the improvement of the present invention includes the provision a connector means indicated generally at 40, on an end fitting indicated generally at 20, on the shoulder strap 11, to be releasably received within a connector pin receiving means indicated generally at 50 provided as part of the buckling means of the lap belt. The connector pin is biased against removal from the connector pin receiving means after assembly thereto by the provision of a spring means associated therewith and as indicated generally at 60.

The end fitting indicated generally at 20, secured to the end of shoulder strap 11 in the exemplary embodiment, includes a connector body 21 having a base plate 22 and a pair of spaced upstanding side walls 23 and 24. The cover plate 25 is provided to enclose a knurled, roll or load bar 26 slidably mounted in opposed incline slots in the connector side walls in known manner. Load bar 26 may be provided with flattened ends, as end 27 seen in FIG. 5, to slide within inclined slots or apertures provided in the connector body side walls, as slot 28 in FIG. 5. Shoulder strap 11 may be mounted to the end fitting or shoulder strap connector 20 in any known manner, the aforedescribed construction being exemplary in nature only.

The shoulder strap end fitting or connector, indicated generally at 20, as particularly contemplated within the present invention, is provided with a connector pin, indicated generally at 40, which extends laterally outwardly of the end fitting or connector. The connector pin includes an enlarged head portion 41 and a generally round body portion 42 fixed to a plate-like extension 43, which in the exemplary embodiment, is formed integrally with the base of the connector or fitting for the shoulder strap. Pin body 42 extends laterally outwardly of the shoulder strap end fitting to be received within the connector pin receiving means, indicated generally at 50, provided on the exemplary buckle, indicated generally at 30, to releasably assemble the shoulder strap 11 to the lap belt buckling means. In the exemplary embodiment, loading upon shoulder strap 11 is thus transmitted through the strap end fitting and its associated connector pin directly into the buckling means which is connected directly to the metal floor anchorage or harp 17.

Referring now particularly to FIG. 3, it can be seen that the connector pin receiving means, including an abutment means against which the connector pin is rotably journaled upon assembly of the shoulder strap end fitting to the buckle means, is formed integrally with the buckle means base plate or main frame member 31. Main frame member 31, of the otherwise conventional buckling means as hereinbefore described, is provided with an offset extension 51 formed integrally therewith to provide the connector pin receiving and abutment means according to the present invention. Buckle main frame member 31 and extension 51 are preferably made of SAE 4130 cold rolled steel approximately 0.12 inch thick.

Referring now to FIG. 3, the extension or yoke portion 51 is provided generally parallel to the buckle base plate or frame member 31, but is offset therefrom by the interconnecting integral leg portions 52 and 53. Extension portion 51 is provided with a large aperture 54 into which the connector pin body 42 and its associated enlarged head portion 41 may be easily inserted to place the head 41 beneath the level of the extension 51. Aperture 54 also includes a second smaller portion providing a generally semi-circular abutment surface 55 in the extension 51. Connector pin body 42 may be moved laterally within aperture 54, after being received therethrough, to bring it into engagement with the spring means provided therein as hereinafter explained.

Spring means, indicated generally at 60 in the exemplary embodiment of FIGS. 2–6, are provided according to the present invention as part of the connector pin receiving and abutment means. As best seen in FIGS. 3 and 6, the spring means, indicated generally at 60, includes a generally circular, split ring body 61 having a pair of outwardly extending leg portions 62 and 63. Spring body portion 61 is adapted to fit within the smaller aperture portion of aperture 54 against the abutment surface 55 with the legs 62 and 63 extending into slots 56 and 57 provided by the arms 58 and 59 formed integrally of the extension plate 51. Arms 62 and 63 of the spring means serve to locate the spring body portion 61 within the smaller aperture portion against the abutment surface 55 provided in the extension 51, as best seen in FIGS. 2 and 6.

The exemplary spring means, indicated generally at 60, is preferably made of an SAE 1074 annealed spring steel from stack having approximately a .025 inch diameter. The spring steel should be heat treated (approximately to a Rockwell 30-N reading of 64 to 68) so that a spring having a body 61 inner diameter of .30 inch may have its juncture with the legs 62 and 63 opened up to .26 inch without any permanent set occurring while the body is held to a .365 inch diameter by a 180 degree fixture. It is thereafter preferably cadmium plated.

A cover or housing 65 is provided to retain the spring means, indicated generally at 60, assembled to the buckle frame member extension 51 and to assist in guiding movement of the associated connector pin into assembled relationship with the connector pin and receiving means provided by surface 55 and spring body 61. Cover 65 is provided with a transverse slot 66 to be positioned over the plate like extension 51 and includes a generally U-shaped aperture 67 to be aligned with the smaller aperture portion defined by the abutment surface 55. Pin holes 68 and 68', as seen in FIG. 3, are provided to receive the locking pins 69 and 69', as seen in FIGS. 2 and 6, which hold the cover 65 onto the base plate extension 51. Camming surfaces 70 and 71, as seen in FIGS. 3 and 5, are provided on the cover 65 to guide the pin body 42 into the abutment or pin journaling means provided by the surface 55 and associated spring body 61. Cover 65 is preferably made of a plastic material, such as that sold under the trade name Zytel 101 Nylon.

From the foregoing it can be seen that the improved shoulder strap-belt buckle connector device according to the present invention allows easy assembly and release of the shoulder strap end fitting directly to a structural main frame member of the buckling means of the associated lap belt. The end fitting of the exemplary embodiment together with its connector pin, indicated generally at 40, is easily inserted through the aperture 54 of the buckle main frame member extension 51 and thereafter is moved laterally into the smaller aperture provided by the yoke or extension plate surface 55. Abutment surfaces 70 and 71 of the cover 65 assist in guiding the connector pin toward the abutment pin journaling means provided by the cooperating spring body 61 and the surrounding supporting abutment surface 55. The resilient spring body 61 resiliently deforms outwardly as the pin body 42 passes through the opening provided at the connections between the spring body and its integral outwardly extending legs 62 and 63. Thereafter, spring body 61 biases the connector pin against removal from the buckle base member extension 51.

When the connector pin of the shoulder strap end fitting is rotably journaled in the socket or abutment means (provided by the spring body 61 and surrounding surface 55) of the buckle member extension 51, loading applied by the passenger's body to the shoulder strap 11 is transmitted directly through the end fitting and connector pin into the main structural member 31 of the associated buckle means through spring body 61. Surface 55, provided by the buckling means main frame member extension 51, may be considered to be an abutment or pin journaling surface since it receives strap loading applied to the connector pin body 42 directly through the spring body 61.

The surface 55 provided in extension 51 is preferably semi-circular describing an arc of approximately 180 degrees. The pull of strap 11 diagonally to the generally horizontally oriented lap belt 10 is then fully received by surface 55. The normal loading direction of shoulder strap pull applied by pin body 42 will be approximately 45 degrees or less to the horizontal axis of the buckle members 31 and extension 51. However, under non-loading condition, the shoulder strap end fitting may be connected on or easily disconnected from the buckle means against the spring bias of spring body 61 without necessarily operating the lap belt buckle. Further, as stated herein, the shoulder strap loading is transmitted directly to a floor fitting through the buckle main structural member to provide a strong secure safety restraint apparatus.

Having thus described an exemplary embodiment of the improvement in shoulder strap-lap belt buckle connector device according to the present invention, it should be noted and understood by those skilled in the art that other modifications, adaptations and alternative embodiments of the exemplary connector device may be made within the scope of the present invention which is defined by and limited only by the following claims.

We claim:

1. In a combination shoulder harness and lap belt restraint device for use by passengers in moving vehicles wherein the lap belt includes a strap having a floor anchorage at one end and a buckle means at the other end for releasably locking to a floor anchored buckle connecting fitting and a shoulder strap is to be releasably connected to said connecting fitting through said lap belt, the improvement comprising a shoulder strap-lap belt buckle connector device including the provision of:

an end fitting secured to an end of said shoulder strap to be interconnected with said lap belt, said end fitting including a base member and a connector pin extending laterally outwardly of said base member; and abutment means provided on said lap belt buckle means for receiving said connector pin to assemble said shoulder strap end fitting to said lap belt buckle means and for preventing separation of said assembled buckle means and shoulder strap end fitting under loading on said straps.

2. The improvement of claim 1 wherein:

said abutment means includes spring means for biasing a received connector pin against removal from said buckle means.

3. The improvement of claim 2 wherein:

said abutment means includes a connector pin receiving aperture into which said pin is inserted and a smaller, semi-circular aperture portion into which said pin is laterally movable after insertion into said aperture; and said spring means includes a generally circular, split ring body portion disposed in said smaller aperture portion to receive and resiliently hold therein a pin received in said smaller aperture portion, said pin abutting said spring within said abutment means to transmit loading from said shoulder strap to said buckle means and its associated floor anchorages.

4. The improvement of claim 1 wherein:

said lap belt buckle means base member includes means for securing the lap belt strap thereto and on offset extension integral with said base and extending rearwardly of the buckle over said lap belt strap;

said abutment means includes a semi-circular abutment surface provided in an apertured portion of said base offset extension; and said connection pin includes a generally round body portion to laterally abut said abutment surface when received into said apertured portion of said base and a head portion to lie under said base offset extension and over said lap belt strap to prevent vertical withdrawal of said connector pin from said offset extension when received therein.

5. The improvement of claim 4 wherein:

said base offset extension is provided with a pair of opposed slots opening into said apertured portion generally adjacent said abutment surface; and spring means are provided on said extension including a body portion positioned at said semi-circular abutment surface and a pair of outwardly extending leg portions extending into said opposed slots to locate said spring within said buckle base offset extension.

6. The improvement of claim 5 including the provision of:

cover means on said base offset extension for retaining said spring means assembled to said extension.

7. In a combination shoulder harness and lap belt restraint device including a single shoulder strap positioned diagonally across the users body and a lap belt buckling means, the improvement comprising the provision of:

a connector pin on and projecting laterally of an end fitting secured to an end of said shoulder strap;

connector pin receiving means on said buckling means including a first aperture portion for receiving said connector pin laterally through said receiving means and a second smaller aperture portion into which said pin is positioned to transmit strap loading on said shoulder strap into said lap belt through said connector pin and buckling means; and spring means associated with said pin receiving means for biasing said pin against removal from said second aperture portion when positioned therein.

8. The improvement of claim 7 wherein:

said buckling means includes a main frame member to which a lap belt strap is attached and through which loading on said lap belt is transmitted; and said connector pin receiving means on said buckling means is formed integrally of said main frame member.

9. The improvement of claim 7 wherein:

said spring means associated with said pin receiving means includes a spring member disposed within said second aperture portion which receives said pin therein to resiliently bias said pin against withdrawal from said second aperture portion.

References Cited

UNITED STATES PATENTS

| | | | |
|---|---|---|---|
| 343,715 | 6/1886 | Lind | 24—73.05 |
| 2,754,073 | 7/1956 | Holm et al. | 297—385 X |
| 2,803,864 | 8/1957 | Bishaf | 24—75 |

FOREIGN PATENTS

| | | |
|---|---|---|
| 1,344,478 | 10/1963 | France. |
| 643,392 | 7/1962 | Italy. |

JAMES T. McCALL, *Primary Examiner.*